US009424236B2

(12) United States Patent
Sullivan et al.

(10) Patent No.: US 9,424,236 B2
(45) Date of Patent: Aug. 23, 2016

(54) FILTERED STYLESHEETS

(75) Inventors: Blake Sullivan, Redwood City, CA (US); Jeanne Marie Waldman, Half Moon Bay, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 13/094,549

(22) Filed: Apr. 26, 2011

(65) Prior Publication Data

US 2012/0278700 A1    Nov. 1, 2012

(51) Int. Cl.

| | | |
|---|---|---|
| G06F 17/00 | (2006.01) | |
| G06F 17/21 | (2006.01) | |
| G06F 9/44 | (2006.01) | |
| G06F 17/22 | (2006.01) | |
| H04L 12/58 | (2006.01) | |
| H04L 29/06 | (2006.01) | |
| H04L 29/08 | (2006.01) | |
| G06Q 10/10 | (2012.01) | |

(52) U.S. Cl.
CPC ............... *G06F 17/218* (2013.01); *G06F 9/44* (2013.01); *G06F 17/2282* (2013.01); *H04L 51/063* (2013.01); *H04L 51/066* (2013.01); *H04L 51/08* (2013.01); *H04L 67/2823* (2013.01); *H04L 67/42* (2013.01); *G06Q 10/107* (2013.01)

(58) Field of Classification Search
CPC ..... H04L 51/066; H04L 67/42; H04L 51/063; H04L 51/08; H04L 67/2823; G06F 9/44; G06F 17/2282; G06Q 10/107
USPC .................. 715/235, 236; 709/206
See application file for complete search history.

(56) References Cited

U.S. PATENT DOCUMENTS

| 5,708,806 A | 1/1998 | DeRose et al. |
|---|---|---|
| 5,970,496 A | 10/1999 | Katzenberger |
| 6,052,730 A | 4/2000 | Feliciano et al. |

(Continued)

FOREIGN PATENT DOCUMENTS

| CN | 103348321 | 10/2013 |
|---|---|---|
| CN | 103348346 | 10/2013 |

(Continued)

OTHER PUBLICATIONS

Allen, D. "Seamless JSF, Part 2: Conversations with Seam", DeveloperWorks, May 1, 2007, 16 pages.

(Continued)

*Primary Examiner* — Nathan Hillery
(74) *Attorney, Agent, or Firm* — Kilpatrick Townsend & Stockton LLP

(57) ABSTRACT

In one set of embodiments, a web document is associated with a style sheet that can include style rules, which provide details about how the document is to be presented and formatted by, for example, a web browser. A reduced set of style rules is determined based upon contents of the web document and style sheet. Reducing the size of the style sheet is desirable, e.g., to increase communication and processing efficiency when the style sheet is sent with the document in an e-mail message. The reduced set of style rules can include rules that are referenced by user interface components present in the document, and can exclude rules that are not referenced by the document, or are incompatible with or not applicable to e-mail. The reduced set of style rules can be embedded in an e-mail message or other communication in place of the original style sheet.

17 Claims, 10 Drawing Sheets

(56) References Cited

U.S. PATENT DOCUMENTS

| | | | |
|---|---|---|---|
| 6,061,697 | A | 5/2000 | Nakao |
| 6,418,471 | B1 | 7/2002 | Shelton et al. |
| 6,427,123 | B1 | 7/2002 | Sedlar |
| 6,654,734 | B1 | 11/2003 | Mani et al. |
| 6,981,218 | B1 | 12/2005 | Nagao |
| 6,990,632 | B2 | 1/2006 | Rothchiller et al. |
| 7,024,622 | B1 | 4/2006 | Young |
| 7,124,358 | B2 | 10/2006 | Carpenter |
| 7,237,192 | B1 | 6/2007 | Stephenson et al. |
| 7,444,374 | B1* | 10/2008 | Baker ............... 709/206 |
| 7,716,322 | B2 | 5/2010 | Benedikt et al. |
| 7,934,201 | B2 | 4/2011 | Sweis |
| 8,103,913 | B2 | 1/2012 | Zambrana |
| 8,892,635 | B2 | 11/2014 | Sullivan et al. |
| 8,924,934 | B2 | 12/2014 | Sullivan et al. |
| 9,015,226 | B2 | 4/2015 | Sullivan et al. |
| 2002/0087596 | A1 | 7/2002 | Lewontin |
| 2002/0147748 | A1 | 10/2002 | Huang et al. |
| 2003/0009562 | A1 | 1/2003 | Heymann |
| 2003/0037076 | A1* | 2/2003 | Bravery ............... G06F 17/218 715/235 |
| 2003/0037108 | A1 | 2/2003 | Peiffer et al. |
| 2003/0137539 | A1* | 7/2003 | Dees ............... G06F 9/4443 715/762 |
| 2003/0221162 | A1 | 11/2003 | Sridhar |
| 2003/0233420 | A1* | 12/2003 | Stark et al. ............... 709/206 |
| 2004/0133563 | A1 | 7/2004 | Harvey et al. |
| 2004/0193699 | A1 | 9/2004 | Heymann |
| 2005/0060046 | A1* | 3/2005 | Ito ............... G06F 17/22 700/17 |
| 2005/0071464 | A1 | 3/2005 | Kuwata et al. |
| 2005/0091510 | A1 | 4/2005 | McKeon et al. |
| 2005/0228621 | A1 | 10/2005 | Matsuo et al. |
| 2006/0005132 | A1 | 1/2006 | Herdeg |
| 2006/0031781 | A1 | 2/2006 | Keohane et al. |
| 2006/0048096 | A1* | 3/2006 | Jiang et al. ............... 717/115 |
| 2006/0112164 | A1 | 5/2006 | Sawada |
| 2006/0242563 | A1* | 10/2006 | Liu et al. ............... 715/513 |
| 2006/0279571 | A1 | 12/2006 | Mori et al. |
| 2007/0043701 | A1 | 2/2007 | Klementiev et al. |
| 2007/0240118 | A1 | 10/2007 | Keren |
| 2007/0245231 | A1* | 10/2007 | Kibler ............... 715/513 |
| 2007/0250601 | A1 | 10/2007 | Amlekar et al. |
| 2007/0271382 | A1 | 11/2007 | Douiri et al. |
| 2008/0092119 | A1 | 4/2008 | Sweis |
| 2008/0172598 | A1 | 7/2008 | Jacobsen et al. |
| 2008/0183753 | A1 | 7/2008 | Maes |
| 2008/0195819 | A1 | 8/2008 | Dumont |
| 2008/0313659 | A1* | 12/2008 | Eide et al. ............... 719/328 |
| 2008/0317347 | A1 | 12/2008 | Lim et al. |
| 2009/0006627 | A1 | 1/2009 | Castellucci et al. |
| 2009/0030620 | A1* | 1/2009 | Novo et al. ............... 702/21 |
| 2009/0049427 | A1 | 2/2009 | Zhao |
| 2009/0106769 | A1 | 4/2009 | Nakamura |
| 2009/0198787 | A1 | 8/2009 | Broda et al. |
| 2009/0210498 | A1* | 8/2009 | Sze et al. ............... 709/206 |
| 2009/0235159 | A1* | 9/2009 | Hosoda ............... 715/235 |
| 2009/0276488 | A1* | 11/2009 | Alstad ............... 709/203 |
| 2009/0307582 | A1* | 12/2009 | Rasmussen ............ G06F 17/227 715/236 |
| 2010/0031153 | A1 | 2/2010 | Ortwein et al. |
| 2010/0174981 | A1* | 7/2010 | Jiang et al. ............... 715/236 |
| 2010/0211893 | A1 | 8/2010 | Fanning et al. |
| 2010/0332920 | A1 | 12/2010 | Ashida et al. |
| 2011/0004665 | A1* | 1/2011 | Kim et al. ............... 709/206 |
| 2011/0022948 | A1* | 1/2011 | Brown et al. ............... 715/236 |
| 2011/0137973 | A1* | 6/2011 | Wei et al. ............... 709/202 |
| 2011/0145698 | A1* | 6/2011 | Penov et al. ............... 715/235 |
| 2011/0173589 | A1 | 7/2011 | Guttman et al. |
| 2011/0191676 | A1 | 8/2011 | Guttman et al. |
| 2011/0239104 | A1 | 9/2011 | Prasad et al. |
| 2011/0271173 | A1 | 11/2011 | Aït-Mokhtar et al. |
| 2012/0084133 | A1 | 4/2012 | Ross et al. |
| 2012/0102392 | A1 | 4/2012 | Reesman et al. |
| 2012/0204091 | A1 | 8/2012 | Sullivan et al. |
| 2015/0067547 | A1 | 3/2015 | Sullivan et al. |
| 2015/0188781 | A1 | 7/2015 | Sullivan et al. |

FOREIGN PATENT DOCUMENTS

| | | |
|---|---|---|
| EP | 1041496 A2 | 10/2000 |
| JP | 2007510200 | 4/2007 |
| WO | 2004057483 | 7/2004 |

OTHER PUBLICATIONS

Jiang, C. "BigPipe: Pipelining web pages for high performance" Jun. 4, 2010, 5 pages.

Chapter 6. Conversations and workspace management, downloaded from Internet http://docs/jboss.org/seam/1.1GA/reference/ec/html/conversations.html on Oct. 3, 2011, 10 pages.

"Bytes tech community creating browser tab specific cookie," Dec. 27, 2009, available at http:/lbytes.corn/topic/javascript/answers/878108-creating-browser-tab-specific-cookie, downloaded Feb. 25, 2013.

Tang et al., "Closed-loop load balancing: comparison of a discrete event simulation with experiments", American Control Conference, Proceedings of the 2005 Portland, OR, USA Jun. 8-10, 2005, IEEE, Piscataway, NJ, USA, pp. 2721-2726.

International Search Report and Written Opinion for PCT Application No. PCT/US2012/020104 mailed on Apr. 20, 2012; 12 pages.

International Search Report and Written Opinion for PCT Application No. PCT/US2012/020106 mailed on Mar. 7, 2012; 10 pages.

Final Office Action for U.S. Appl. No. 12/985,805 mailed Sep. 10, 2013, 15 pages.

Non-Final Office Action for U.S. Appl. No. 12/985,805 mailed Feb. 21, 2014, 13 pages.

Final Office Action for U.S. Appl. No. 12/985,799 mailed Oct. 23, 2013, 16 pages.

Final Office Action for U.S. Appl. No. 13/021,668 mailed Jan. 16, 2013, 10 pages.

Non-Final Office Action for U.S. Appl. No. 13/021,668 mailed Aug. 2, 2012, 9 pages.

Non-Final Office Action for U.S. Appl. No. 12/985,805 mailed Feb. 25, 2013.

Final Office Action for U.S. Appl. No. 13/021,668 mailed Jan. 16, 2013.

Notice of Allowance for U.S. Appl. No. 12/985,799 mailed Jan. 14, 2015, 9 pages.

Notice of Allowance for U.S. Appl. No. 12/985,805 mailed Jul. 22, 2014, 8 pages.

Notice of Allowance for U.S. Appl. No. 13/021,668 mailed Sep. 9, 2014, 16 pages.

\* cited by examiner

FILTERED STYLESHEETS

BACKGROUND

Embodiments of the present invention relate generally to structured documents, and more particularly to techniques for reducing the size of style sheets to be sent with structured documents via electronic mail by removing certain information from the style sheets.

The content of pages on the World Wide Web is often represented in Hypertext Markup Language ("HTML") format, which provides formatting commands that are embedded in the content to specify structural aspects of the content, such as section and heading tags that can be used to designate particular text as headings, character formatting tags to specify font sizes and designate text as bold, italic, underlined, image tags to display images, reference tags to create links to other content, and so on. When a web page is to be displayed, these formatting commands are used by an application program such as a web browser to render the HTML and generate the appearance of the web page on a particular display device. The web browser translates the formatting tags to appropriate font styles and sizes, paragraph spacing and formatting, image positioning, link formats (e.g., underlined blue text), and the like, to be applied to the content when displaying the web page on the display device. The details of the particular formatting and positioning of the content in the displayed text, such as the particular font sizes, colors, paragraph formatting, indentation, and the like, can be supplied by the browser using default style rules for formatting and rendering the tags. However, the author or provider of the web page may wish have finer control over the appearance of the content on the web page. The Cascading Style Sheets standard provides a language in which different style rules for the formatting and rendering of tags can be specified and applied to HTML documents.

The Cascading Style Sheets ("CSS") language enables styles such as fonts, colors, spacing, and the like for a web page to be named and specified separately from the HTML documents that contain the structure and content of the web page. The HTML document can refer to the style names instead of using specific values for style elements such as colors, font sizes, margins, and the like. The styles specified in a language such as CSS are referred to herein as style rules. Style rules can be specified for a particular HTML document by including them inline in the HTML document, or by including a particular HTML tag in the document that refers to an "external" style sheet. The external style sheet is ordinarily a file that contains style rules specified in a style sheet language such as CSS. The style rules can be, for example, name-value pairs that provide values for particular named style attributes of an associated HTML tag in a syntax such as <tag> {attribute name: value}. An example style rule is as follows:

h1 {color: blue}

This style rule specifies that text in h1 (i.e., heading level 1) tags in the HTML document is to be rendered in the color blue in documents that refer to the style rule. The "h1" portion is a referred to herein as a "selector." In this example, the h1 selector represents an h1 element in the document tree. The term "selector" refers to the web browser's use of the selector to "select" elements in a web page that match the selector when the web page is being rendered.

External style sheets can be stored, for example, in a file on the web server, to reduce the size of each web page that is sent from the web server to the browser. Since style sheets represent detailed information about the appearance and configuration of a user interface, including "skinning" information, and are represented in a text format, a web framework that provides many different component types may have numerous style sheet rules, numbering in the hundreds or thousands. The external style sheet feature supported by web browsers allows the browser to download the style sheet information once, instead of downloading the style sheet with every web page that uses style rules from the style sheet. However, in one embodiment, when a web page is sent in an e-mail message, the style sheet is included in the page, and external style sheets are not used, because some e-mail client application programs do not support external style sheets. An e-mail generator may not want to use external style sheets for other reasons as well. For example, HTML e-mail readers do not ordinarily have caches, so each time the e-mail is read, the external style sheet would be fetched from a public location, in which case there would be no bandwidth savings when using the external style sheet. As another example, the e-mail messages would then depend on access to the CSS file at an external site. A recipient of the e-mail may save the e-mail and read it months later, at which time the version of the CSS file used for the email would need to be publicly available. Further, the e-mail recipient would have difficulty reading the e-mail without Internet access, since no styling would be available.

HTML tag types such as the paragraph tag <p> can be "styled" by specifying style rules in a style sheet. Furthermore, the CSS language provides for specification of style rules at different levels of granularity, e.g., for all headings of a particular type, or for a specific class of headings of a particular type, or for a single instance of a heading tag, as well as combining multiple style sheets, resolving conflicts between style rules in multiple style sheets, placing style rules in the HTML document as attributes of the elements to which they apply, and so on.

SUMMARY

In one set of embodiments, a web document is associated with a style sheet that can include style rules, which provide details about how the document is to be presented and formatted by, for example, a web browser. A reduced set of style rules is determined based upon contents of the web document and style sheet. The reduced set of rules can include rules that are referenced by user interface components present in the document, and can exclude rules that are not referenced by the document, or are incompatible with or not applicable to e-mail. Reducing the size of the style sheet is desirable, e.g., to increase communication and processing efficiency when the style sheet is sent with the document as part of an electronic mail (e-mail) message. The reduced set of style rules can be embedded in an e-mail message or other communication in place of the original style sheet.

In accordance with embodiments of the invention, a request is received to generate an e-mail message for a document such as a web page. The web page may be associated with a style sheet, which defines style rules that specify properties of the user interface presented by the web page.

In one or more embodiments, the filtering is performed by identifying style rules that are used by the document and are compatible with e-mail messages, and embedding those style rules in the e-mail message. Style rules that are not needed by the document or are incompatible with e-mail are also identified and excluded from the electronic mail message. A set of style rules to be used by a recipient of the e-mail to render and display the web page without reference to an external style sheet is thus generated with relatively little cost in performance compared to alternative techniques such as rendering the entire document to determine the needed and compatible style rules, or embedding all of the style sheet's style rules in the e-mail message.

According to one embodiment of the present invention, a method is provided that includes receiving, by a computer system, a request to generate an e-mail message, and further receiving a web document to include in the e-mail message, wherein the web document comprises an initial style sheet. The method further includes determining, based upon contents of the document, a reduced set of style rules from the initial style sheet to be included in the e-mail message; and embedding the reduced set of style rules and the contents of the document in the e-mail message.

Embodiments of the invention may include one or more of the following features. Determining the reduced set of style sheet rules may include identifying at least one user interface component referenced by the document, identifying at least one style rule associated with a user interface type associated with the at least one user interface component, and embedding the at least one style rule in the e-mail message if the user interface type is compatible with e-mail messages. The user interface type may be compatible with e-mail messages if the user interface type includes a read-only mode. The user interface type may be compatible with e-mail messages if the user interface type is configured to only execute operations that are available in an e-mail client application. The user interface type may be compatible with e-mail messages if the user interface type does not use a scripting language. The determining may be performed without rendering the web document. In one embodiment, a style sheet that includes the reduced set of style rules is smaller in size than the initial style sheet.

According to another embodiment of the present invention, a computer system is provided. The computer system includes a processor configured to receive a request to generate an e-mail message and receive a web document to include in the e-mail message, where the web document includes an initial style sheet. The processor is further configured to determine, based upon contents of the document, a reduced set of style rules from the initial style sheet to be included in the e-mail message, and to embed the reduced set of style rules and the contents of the document in the e-mail message.

According to another embodiment of the present invention, a machine-readable medium for a computer system is provided. The machine-readable medium has stored thereon a series of instructions executable by a processor, the series of instructions including instructions that cause the processor to receive a request to generate an e-mail message and further receiving a web document to include in the e-mail message, where the web document includes an initial style sheet, instructions that cause the processor to determine, based upon contents of the document, a reduced set of style rules from the initial style sheet to be included in the e-mail message, and instructions that cause the processor to embed the reduced set of style rules and the contents of the document in the e-mail message.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

In one set of embodiments, a web document such as a web page, has a "send via e-mail" feature that causes the document to be sent as part of an electronic mail (e-mail) message. The web document is associated with a style sheet that includes both needed and unneeded style rules. The style rules provide details about how the document is to be presented and formatted, e.g., in a web browser. The size of the e-mail message is reduced by determining, based upon contents of the web document, a reduced set of style rules from the style sheet, and embedding the reduced set of rules in the e-mail message. The reduced set of rules includes rules that are referenced by the user interface components that are present in the web document, and excludes rules that are incompatible with e-mail messages or e-mail message client applications.

In one set of embodiments, the "send via e-mail" feature may appear in the user interfaces of web applications as a button labeled, for example, "E-mail Page." The unneeded rules mentioned above may include rules for portions of the page that are unsuitable for inclusion in an e-mail message, e.g., user interface components that are not meaningful outside the web application user interface, such as components for selecting different pages. The unneeded rules may also include rules in the style sheet that are not needed when the page is displayed in an e-mail message, such as rules for components not used by the page. The unneeded rules may also contain the rules related to components that exist in the web page document 104, but do not need to be rendered for this request. For example, the e-mail may be being sent to hourly employees and the document may contain components that are only used in a part of the page that is only rendered for salaried employees.

Figure 1:
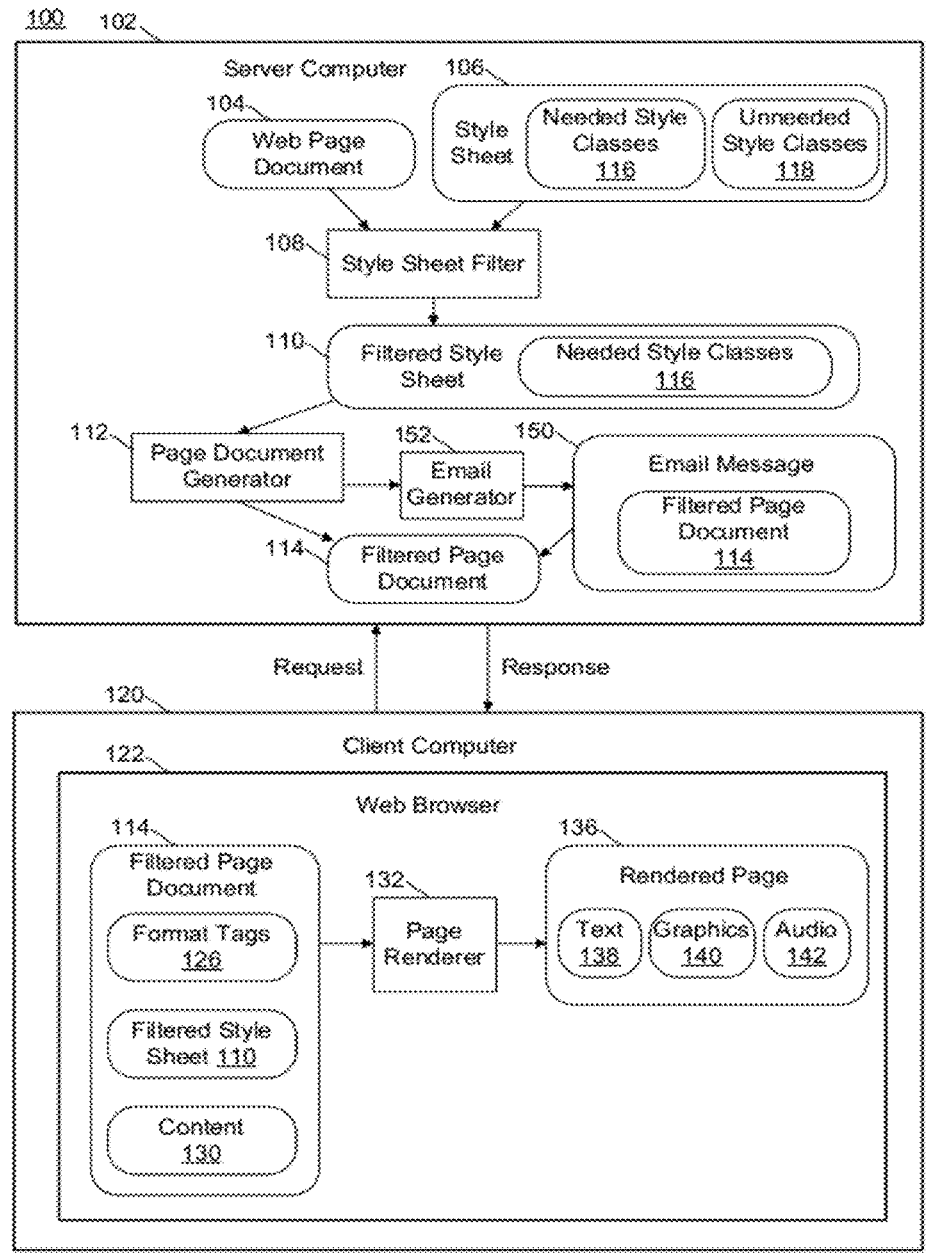
FIG. 1 is a simplified block diagram illustrating filtering of style sheets for inclusion in e-mail messages in accordance with embodiments of the invention.

FIG. 1 is a simplified block diagram illustrating a system 100 for filtering style sheets for inclusion in e-mail messages in accordance with embodiments of the invention. The filtering system 100 may be a software system, a hardware system, an enterprise system, or the like. In one or more embodiments, a web browser application program 122 executing on a client computer 120 presents a web page document 104, e.g., a Hypertext Markup Language (HTML), Java Server Pages (JSP), Java Server Faces (JSF), or other markup language, document received from a server computer 102, to a user via a display device (not shown). The web page document 104 can be rendered for display by the web browser 122 using an initial style sheet 106 that specifies formatting details for the web page document 104. The initial style sheet 106 may include, for example, text descriptions of style rules specified in the Cascading Style Sheet (CSS) language. The initial style sheet 106 may be embedded in the web page document 104, or may be stored in a file referenced by the web page document 104. A page renderer 132 of the web browser 122 can generate a rendered page 136 based on the page document 104 and the initial style sheet 106. The rendered page 136 can be displayed by the web browser 122, and includes text 138, graphics 140, and audio 142, which are generated by the page renderer 132 with the formatting details specified in the initial style sheet 106.

In one set of embodiments, a filtered (i.e., reduced size) style sheet 110 is generated on the server computer 102 and is received by the web browser 122 on the client computer 120 for display to a user (not shown). The size of the filtered style sheet 110 is less than the size of the initial style sheet 106. That is, the filtered style sheet can be represented, at least in CSS format, using fewer bytes than the initial style sheet 106. The filtered style sheet 110 is embedded in, copied into, or otherwise associated with a filtered page document 114 by a page document generator 112. The filtered page document 114 is then embedded in an e-mail message 150 by an e-mail generator 152. In one or more embodiments, the e-mail generator is located on the server computer 102. The e-mail generator 152 can, for example, copy an HTML representation of the filtered page document 114 along with the filtered style sheet 110 to the e-mail message 150. The filtered page document 114 can be embedded in the e-mail message 150 as, for example, e-mailable content such as an HTML document or text generated from e-mailable content attached to the e-mail message, or as the text of such a document in the body of the e-mail message, or in other ways that can be recognized by an e-mail application program. The e-mail program can then receive the e-mail message 150 from the server 102 and send the e-mail message 150, including the filtered page document 114, to another user. The other user can then view the filtered page document 114 in an e-mail client that supports HTML and style sheets, or in a web browser, or in any other application program that recognizes the format of the page document 114 in the e-mail message 150.

In one set of embodiments, the e-mail message is generated in response to a user action, such as selection of a button in a user interface. The web browser 122 (or another program) provides a user interface feature such as a button or menu item, e.g., an "E-mail Page" button, which, when selected by the user, causes the filtered page document 114 to be attached or embedded in the e-mail message 150.

In one or more embodiments, the server computer 102 executes a style sheet filter 108, which reduces the size of the initial style sheet 106 by identifying needed style rules 116, i.e., style rules referenced explicitly or implicitly by the web page document 104 and suitable for sending in an e-mail message and/or unneeded style rules 118, i.e., style rules in the initial style sheet 106 that are not needed or are otherwise not to be sent in the e-mail message. The style sheet filter 108 generates a filtered style sheet 110, which includes the needed style rules 116, but not the unneeded style rules 118. The style sheet filter 108 can be, for example, a computer program implemented as processor-executable instructions stored on a machine-readable medium. If the style sheet filter 108 identifies one or more unneeded style rules 118 in the initial style sheet 106, the filtered style sheet 110 is smaller in size than the initial style sheet 106, and can therefore be sent more efficiently via e-mail.

As introduced above, the needed style rules 116 can include style rules that are associated with components of the web page document 104, and can also include style rules whose usage is difficult to determine and therefore are included in case they are used. The web page document 104 can also include style rules that are not referenced explicitly by the web page document 104, but used implicitly, i.e., used or expected to be used by the web page document 104 without being explicitly referenced by the web page document 104. These implicit style rules can include rules identified based on a white list of component types that are added to the set of needed style rules 116 independently of the particular web page document 104, as described below with reference to FIG. 5.

The unneeded style rules 118 can be determined based upon a black list of style rules that are associated with user interface components that are at least partially incompatible with e-mail messages, i.e., components that use features available in a web browser 122 but not available in an e-mail client application. The black list of components that are incompatible with e-mail embedding can be generated and used as described below with respect to FIG. 5. In one embodiment the unneeded style rules 118 are the remaining style rules in the initial style sheet 106 that are not members of the needed style rules 116. In addition to the style rules determined based upon the black list, any style rules in the initial style sheet 106 that are not added to the needed style rules 116 are members of the unneeded style rules 118.

In one embodiment, when a recipient user opens a received copy of the e-mail message 150, a copy of the filtered page document 114 is displayed as part of the e-mail message in, for example, an e-mail client application executing on a different client computer (not shown). One way to create an e-mail message for sending a page document 104 that uses the initial style sheet 106 involves including the entire initial style sheet 106 in the e-mail message, e.g., by copying the initial style sheet 106 directly into the HTML or JSF document to be sent in the e-mail message 150 without modifying the initial style sheet 106. However, directly copying the initial style sheet 106 into the message in this way can result in large e-mail messages, which can in turn result in problems such as excessive use of network bandwidth, failed e-mail delivery because of the message size exceeding a limit set by the e-mail service provider (e.g., 2 megabytes), slow user interface response times, and the like. The initial style sheet 106 is therefore "filtered" to remove unneeded or unused style rules, and the resulting filtered style sheet 110 is included in the filtered page document 114, which is sent to the client computer 120 by the server computer 102 to be sent via e-mail. When there are unneeded style rules 118 in the initial style sheet 106, the filtered style sheet 110 received by the client computer 120 is smaller in size than the initial style sheet 106, and the e-mail message 150 containing the filtered page document 114 with the filtered style sheet 110 can be sent more efficiently than if the filtered page document 114 had included a copy of the initial style sheet 106.

In one or more embodiments, the filtered style sheet 110 is generated by the style sheet filter 108, and passed to a page document generator 112 (e.g., a computer program), which embeds the filtered style sheet 110 in the web page document 104 to generate a filtered page document 114 to be sent to the client computer 120 in response to a request for the web page document 104. In one example, the web browser 122 executing on the client computer 120 requests the filtered page document 114 by sending a Hypertext Transfer Protocol (HTTP) request to a web server program (not shown) executing on the server computer 102, and the web server program sends the filtered page document 114 to the client computer 120 in an HTTP response.

As introduced above, the filtered style sheet 110 can be associated with, or embedded in, the filtered page document 114, so that the parameters controlling the visual appearance (i.e., style) of the web page document 104 can be specified separately from the web page document 104, instead of being "hardcoded" in the web pages 104. The values of the parameters are specified as style rules in the initial style sheet 106. For example, a style rule can be specified in the style sheet 106 in CSS format as follows:

.input {color: red;}

This style rule includes a selector named "input", and a declaration that specifies a property name ("color") and a corresponding value ("red") of the property. A style rule can include a single selector and multiple declarations associated with the single selector, or multiple selectors associated with one or more declarations. Since a style rule has a selector, a selector identifies at least one style rule, so if a selector is known, the corresponding style rule can ordinarily be identified.

The selector can explicitly refer to a particular type of user interface components, so that the selector's attributes apply to components of that type. The particular component type is specified in the selector using the following CSS component selection syntax:

af|inputText {color: red} indicates that the selector "af|inputText" is a component selector and selects components of type af:inputText. The vertical bar character "|" is used to separate namespace prefixes such as "af" from selector names when referring to CSS rules. In one example, the af:inputText component is provided by the Oracle Application Development Framework (ADF) Faces framework. Thus, the style rule definition:

af|inputText {color: red} will colorize red every instance of the af: inputText component in the application.

A class selector can be set on an individual component by specifying a styleClass attribute in the markup language element for that individual component in the web page document 104. The class selector to be used for an individual component instance can be specified in a web page document 104 element for that component instance using the following syntax:

<af|inputText styleClass="AFInstructionText"/>

Thus, the af:inputText tag with styleClass="AFInstructionText" shown above applies the attributes associated with the class selector .AFInstructionText to the individual component defined by that tag in the web page document 104. For example, the color in which the individual af:inputText component will be rendered is set to the value of the .AFInstructionText selector's "color" property. Note that the colon character ":" is used to separate namespace prefixes from component names when referring to components.

Pseudo-element CSS rules are CSS rules that apply to and style a part of an element or component that does not explicitly appear in a document, according to the CSS specification. Pseudo-elements are specified in CSS using the following syntax:

selector::pseudo-element-name {property: value}.

For example, the background color of the content subsection of an af:inputText component can be set to blue by associating the declaration background-color: blue with the af|inputText::content CSS pseudo-element as follows:

af|inputText::content {background-color: blue;}

In one or more embodiments, the style sheet filter 108 filters pseudo-elements similarly to rules, as described in more detail with reference to FIGS. 2-6 below. Thus, style rules often contain a type selector identifying the XML language element to which the rules apply. For example:

af|inputText {color:red}

If the document that this style sheet will be applied to does not contain an <af:inputText> element, then there is no element matching this rule in the document, and the rule can be omitted from the style sheet for that particular document. In addition, since all of the parts of a selector need to evaluate to true in order for a rule to be applied, any rule that contains a type selector can be omitted if the type selector will not evaluate to true for the document. So, if the document does not contain an <af:inputText>, any of the rules that require an af|inputText can be omitted from the style sheet. For example the CSS rules:

af|inputText:hover {background-color:blue}//applied when the mouse hovers over an af:inputText content af|inputText::content {text-weight:bold}//applies to the content sub-area of the af:inputText can both be omitted for documents that do not contain an af:inputText component. The same technique can be applied to other parts of the selector. For example, if some applications, such as certain e-mail readers, do not support the :hover pseudo-class, then any rules with selectors requiring ":hover" can be filtered out of the style sheet prior to sending the style sheet via email.

In one or more embodiments, information on the definition side of the rule, such as CSS properties, can be omitted from style sheets if application(s) to which the style sheets are to be sent, e.g., particular types of e-mail readers, are known to not support the properties.

There may be a relatively large number of style rules associated with the document, some of which are not used or needed by the document. Excluding the unneeded style rules from the message improves performance by, for example, reducing memory consumption and network usage, since reducing the number of rules reduces the size of the e-mail message. In one embodiment, the unneeded style rules can be removed by generating a copy of the document such that the copy includes the needed style rules but not the unneeded style rules, and sending the copy in an e-mail message. In another example, the unneeded rules can be removed from the HTML representation of the web page before the page is sent via e-mail.

Embodiments of the present invention provide techniques for sending representations of web-based application user interfaces via e-mail. Web-based user interfaces may be displayed on web pages in a web browser or other application program, and can be implemented as web pages in a markup language such as HTML or Java® Server Faces ("JSF"). The markup language defines the user interface using "tags" to specify the layout, content, and user interface components to be included in the user interface. The components may perform actions such as sending or receiving data to/from external sources, e.g., receiving input data from a user via a keyboard or displaying output data on a display device. The HTML or JSF markup representation of the web user interface can include computer program code implemented in language such as the JavaScript™ scripting language or the like. The code can implement certain actions performed by the user interface components, such as generating dynamic components that are configured at runtime, sending data to or receiving data from external sources, and so on. User interfaces can be implemented using a user interface framework that provides pre-defined interface components, e.g., buttons, lists, menus, and the like, to simplify the task of implementing the user interfaces. Examples of web user interface frameworks include JSF, Oracle® Application Development Framework ("ADF") Faces, Apache Struts, Apple WebObjects, and the like. User interface frameworks can provide customizable components which can change appearance and behavior in accordance with configuration values such as name value properties. For example, user interfaces defined using the JSF framework can be customized using Cascading Style Sheets (CSS) style rules that specify particular configuration values (e.g., specific colors, fonts, and certain behaviors). In one aspect, the style sheet defines a "skin" or user interface that can be provided or changed by the user, administrator, application developer, or other entity.

In one example, the web-based user interface is provided as a web page in a web-based application such as, for example, an order tracking system, an expense report processing system, an inventory management system, a customer tracking system, or the like. The web page is presented to the user via a browser or similar application. As introduced above, each such page is represented as a document in languages such as HTML, JavaScript, and the like. The web browser or other application, which may execute on a client computer, receives the page document, e.g., from a server computer via a network, and presents a user interface in accordance with the page layout specification (e.g., HTML tags) and style sheet specified in the page document. The user may provide input by entering data in the web page, and may perform other application-related tasks in which the pages act as an interface between the user and the application. The web-based application may provide a series of pages that are presented to the user in a particular order, or in response to particular actions, or at other times as determined by the application.

Including the full set of style rules used by a user interface framework, such as Oracle ADF, in an e-mail message may not be practical because of limitations imposed on the size of an e-mail message by the e-mail system. For example, e-mail systems can be configured to limit the size of e-mail messages, and reject e-mail messages that exceed a certain size. If the combined size of the style rules exceeds the maximum e-mail message size limit, then the page will not be delivered by the e-mail system. Since particular documents ordinarily do not use the full set of style rules defined by the user interface framework, this problem can be avoided by excluding from the e-mail message those style rules not used by the document being sent in the e-mail message. Furthermore, simplifying the style sheet can improve the performance of applying the styles in the user's web browser or e-mail reader.

In one example, the style rules that are not needed by the components of the web page 104 can alternatively be identified by invoking a rendering operation that is ordinarily used to prepare the page for presentation in a web browser. Once the page has been rendered, the set of style rules needed by the page can be determined by identifying the style components needed by each component on the page. In one approach, the rendering operation can simply be executed a second time, the rendered results can be used to identify the needed style rules, and those rules can be included in the HTML document to be sent in the e-mail message. In another approach, the page is rendered once into a buffer, which will be used when the e-mail message is generated. The style rules are collected during the rendering operation and then a token in the buffer is replaced with the style rules. However, rendering the components is a relatively expensive operation in terms of time and memory space. The techniques disclosed herein do not render the page, and produce a result more quickly than the rendering approach. The results produced by the techniques disclosed herein are not necessarily minimal sets of style sheets for the page, but the faster computation time is ordinarily a substantial improvement over the alternatives of using the original set of style rules or rendering the full set of components on the page.

It is also possible to render the filtered page document 114 in the browser 122 using the filtered style sheet 110. In this case, the page renderer 132 can execute more efficiently because the number of style rules in the filtered style sheet 110 is less than the number of rules in the initial style sheet 106. In one aspect, if the filtered style sheet 110 has been generated for an e-mail message, then the filtered style sheet 110 can be used by the web browser 122 (in addition to or as an alternative to an e-mail client program) to more quickly generate the rendered page 136.

Figure 2:
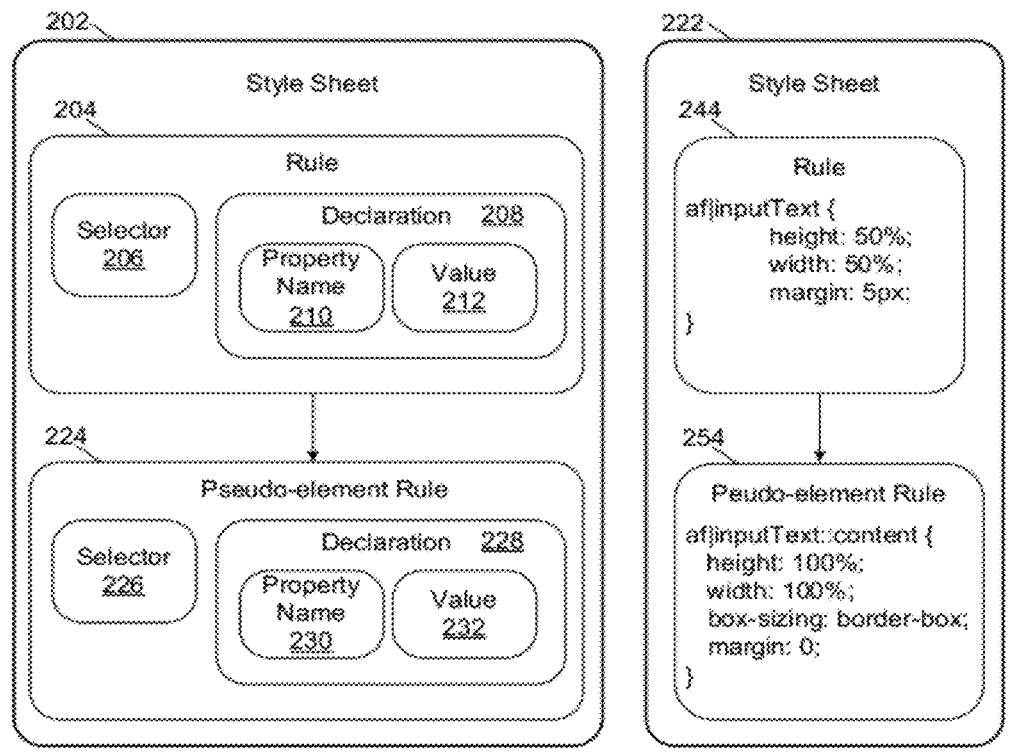
FIG. 2 is a block diagram illustrating style sheet rules.

FIG. 2 is a block diagram illustrating style sheet rules. An example style sheet 202 illustrates the structure of style rules. The style sheet 202 includes a rule 204 and a pseudo-element rule 224 of the rule 204. The rule 204 includes a selector 206 and a declaration 208, which in turn includes a property name 210 and a value 212. The pseudo-element rule 224 similarly includes a selector 226 similar to the rule selector 206 and a declaration 228, which includes a property name 230 and a value 232.

As a more specific example, a second example style sheet 222 includes a rule 244 with a selector named af|inputText, which corresponds to an ADF af:inputText component, and three declarations: height 50%, width: 50%, and margin: 5 px. The style sheet 222 also includes a pseudo-element rule 254, with a selector named af|inputText::content and four declarations: height: 100%, width: 100%, box-sizing: border-box, and margin: 0. The values specified in the pseudo-element rule 254 can override values of the same name specified in the rule 244.

Figure 3:
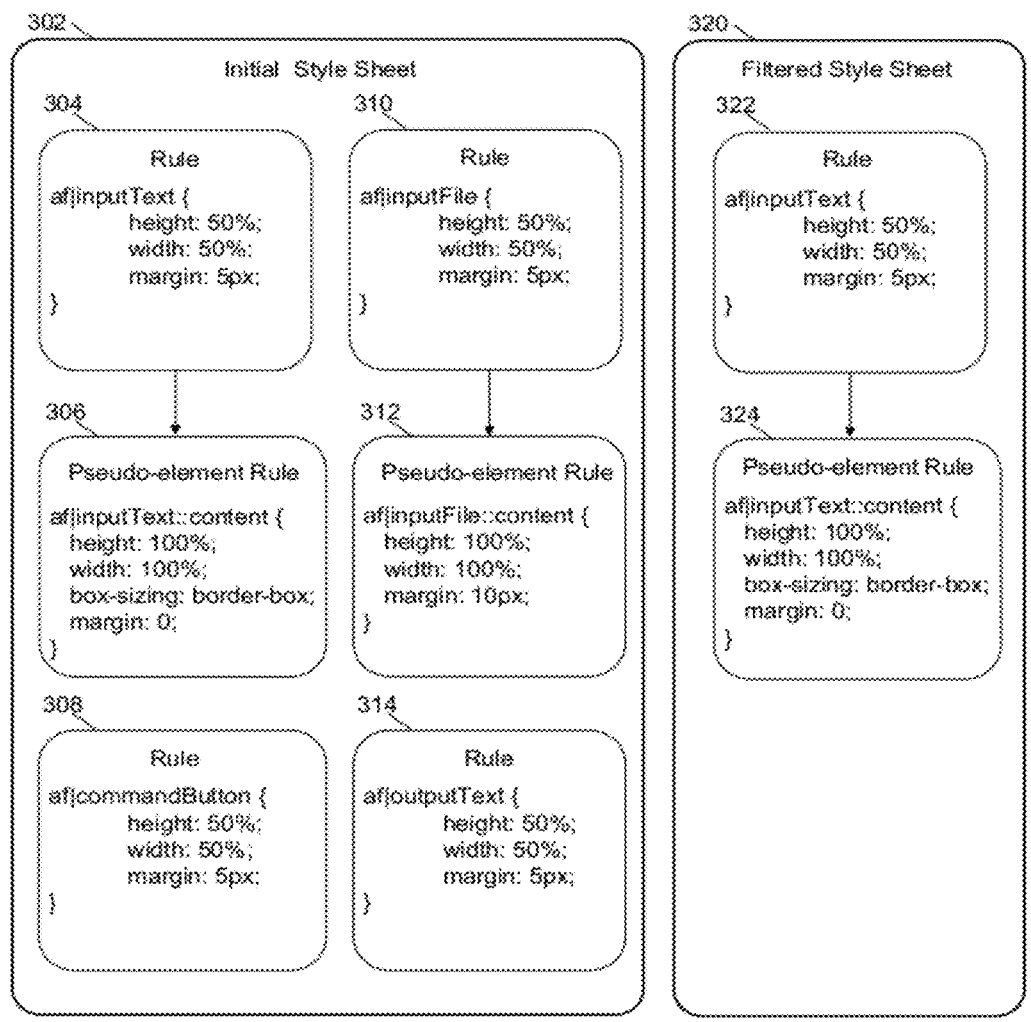
FIG. 3 is a block diagram illustrating style sheet filtering in accordance with embodiments of the invention.

FIG. 3 is a block diagram illustrating style sheet filtering in accordance with embodiments of the invention. An initial, i.e., unfiltered, style sheet 302 includes a number of rules and pseudo-element rules, such as an af|inputText rule 304, which corresponds to and can be used to style the ADF af:inputText component. The af|inputText rule 304 has a pseudo-element rule 306 of type af|inputText::content, which corresponds to the content portion of the af:inputText ADF component. Furthermore, an af|commandButton rule 308 corresponds to a CommandButton ADF interface component. An af|inputFile rule 310 corresponds to the ADF af:inputFile component. The af|inputFile rule 310 has a pseudo-element rule 312 of the type af|inputFile::content, which corresponds to the content portion of the ADF af:inputFile component, i.e., af:inputFile::content. An af|outputText rule 314 in the style sheet 302 corresponds to the ADF af:outputText component.

A filtered style sheet 320 illustrates the result of applying the style sheet filter 108 of FIG. 1 to the initial style sheet 302 for a web page document 104 that uses the af:inputText tag, but does not use the af:commandButton, af:inputFile, or af|outputText tags. As described above, a filtered style sheet 320 includes the rules of the initial style sheet 302 that are suitable for sending in an e-mail message for a particular web page document 104. In one or more embodiments, pseudo-element rules of each rule are included in the filtered style sheet 320. The style sheet filter 108 places the af|inputText rule 304 and af|inputText::content pseudo-element rule 306 in the filtered style sheet 320 as a rule 322 and a pseudo-element rule 324, respectively, because the example web page document 104 uses the af:inputText tag (to include the af:inputText component in the page). The af|inputText::content pseudo-element is placed in the filtered style sheet because of the inclusion of its parent rule af|inputText. The af|inputFile rule 310 is not included in the filtered style sheet 320 because the example web page document 104 does not use or refer to the af:inputFile component tag. Similarly, the af|outputText rule 314 is not included in the filtered style sheet 320 because the web page document 104 does not use or refer to the af:outputText tag.

In another example, if the web page document 104 for which the filtered style sheet 320 is generated does not include any tags that refer to style rules, then no rules are added to the filtered style sheet 320. In yet another example, if the web page document 104 uses the af:commandButton tag that corresponds to the rule 308, but not the af:inputText, af:inputFile, or af:outputText tag, then the filtered style sheet 320 includes only the af|commandButton rule. As another example, if the web page document 104 uses the af:inputFile tag but not the af:commandButton, af:inputText, or af:outputText tag, then the filtered style sheet 320 includes only the af|inputFile rule and the af|inputFile::content pseudo-element. In one or more embodiments, selectors that are not specific to a component are also added to the filtered style sheet 320, independently of the content of the web page document 104.

Figure 4:
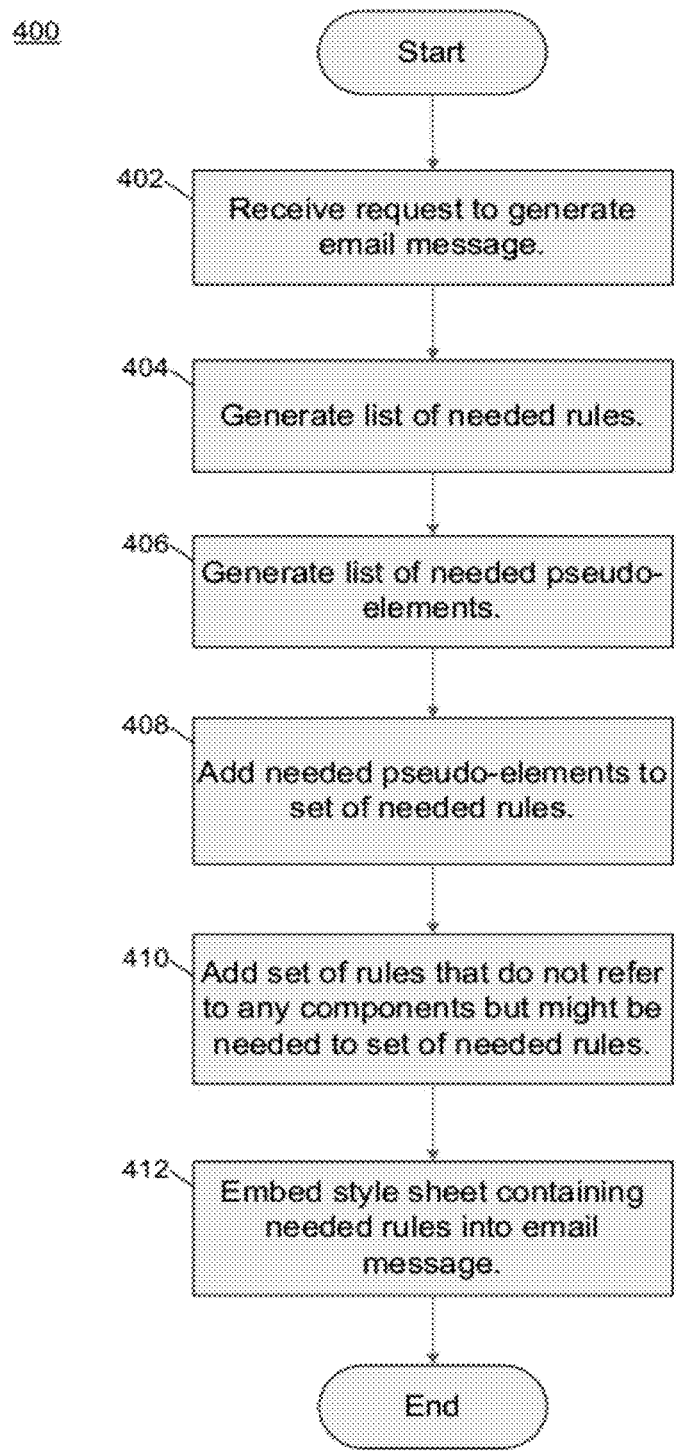
FIG. 4 is a flow diagram illustrating a method for embedding a document and a style sheet based on the document in an electronic mail message in accordance with embodiments of the present invention.

FIG. 4 is a simplified flow diagram illustrating a method for embedding a document, and a style sheet based on the document, in an electronic mail message according to an embodiment of the present invention. The processing depicted in FIG. 4 may be performed by software (executed by a processor), hardware, or combinations thereof. In one set of embodiments, the processing depicted in FIG. 4 can be performed by style sheet filter component 108 of FIG. 1.

The method of FIG. 4 generates a list of style rules to be included in an e-mailable form of the document. The document may be, for example, a web page or other document that uses style rules. Block 402 receives a request to generate an e-mail message, e.g., in response to selection of an "E-mail Page" user interface feature as described above, which initiates the process of generating an e-mail message for the web page on which the "E-mail Page" feature was selected. Block 404 generates a list of needed style rules (such as af|inputText), based on the web page 104, to be included in the e-mail message, as described below with reference to FIG. 5.

Block 406 generates a list of pseudo-elements, such as af|inputText::content, that are needed or used by the web page and are to be included in the e-mail message, e.g., the pseudo-elements of the needed style rules identified in block 404, as described below with reference to FIG. 6. Block 408 adds the needed pseudo-elements to the set of needed style rules. For example, if there is a style rule for the af|inputText component with the declaration color: red, and a style rule for af|inputText::content with the declaration color:blue, then those two declarations would be added to the set of needed style rules in association with the style rule af:inputText and the pseudo-element af|inputText::content, respectively, because, in one embodiment, both of those names contain the substring af|inputText. Block 410 adds a set of style rules that do not refer to any components to the list of needed style rules, since these style rules may be needed by components on the web page.

Style rules that do not refer to any components include those style rules with selectors that do not contain the vertical bar "|" character, i.e., style rules that do not refer to an individual component. Thus the style rules that do not refer to any components can be identified by searching the selectors and returning those without a "|" character. These selectors without a "|" character are, for example, class selectors and HTML element selectors, such as the "body" selector. For example, the selector body {font-family: Ariel} is not specific to any component, and specifies that the appearance of the HTML body element is to be set.

Block 412 generates a reduced style sheet that includes the needed style rules, and embeds the reduced style sheet in a resulting document such as an e-mail message. The reduced style sheet may be written to a file as an external style sheet as an alternative to being embedded in a document directly. In one set of embodiments, the reduced style sheet is for an e-mail message, and is embedded in an HTML document that is in turn embedded in the e-mail message, since e-mail messages do not support external style sheets. In another set of embodiments, the reduced style sheet is written to a file and can be used in other ways, e.g., when using the resulting HTML document for a different purpose than e-mail, or when sending an e-mail message at a future time. The techniques described herein for reducing the size of style sheets are not limited to use with e-mail messages but can be used in other applications, e.g., to remove unused portions of style sheets that are used by web browsers in particular situations, such as mobile web browsers or web browsers embedded in other applications.

Figure 5:
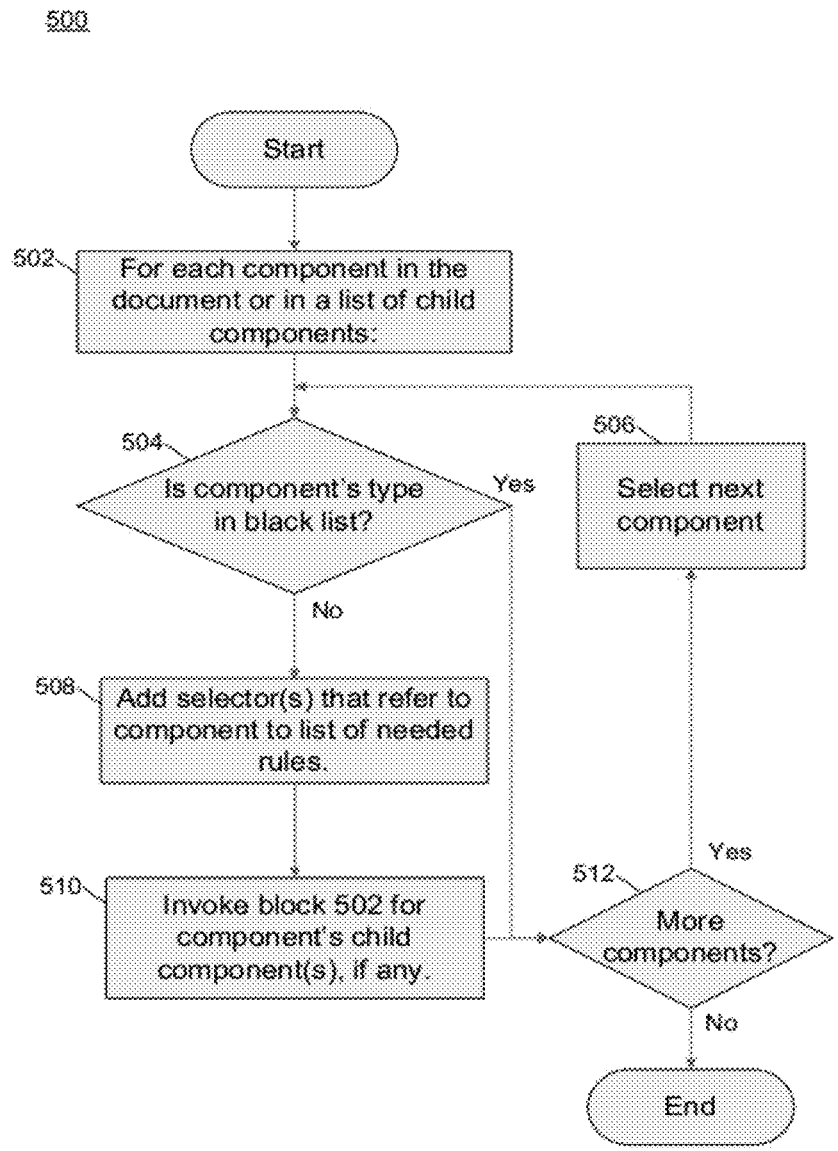
FIG. 5 is a flow diagram illustrating a method for generating a reduced set of style rules based on a document in accordance with an embodiment of the present invention.

FIG. 5 is a simplified flow diagram illustrating a method for generating a reduced set of needed style rules based on a document according to an embodiment of the present invention. The processing depicted in FIG. 5 may be performed by software (executed by a processor), hardware, or combinations thereof. In one embodiment, the processing depicted in FIG. 5 is performed in step 404 depicted in FIG. 4. The method uses a white list of component types for which style rules are to be included in the reduced set and a black list of component types for which style rules are to be excluded from the reduced set. In one set of embodiments, the white and black lists are independent of the web page document and can be generated as described below prior to receiving the web page. The method generates the reduced set of needed style rules by identifying the components in the web page, and, for each component, including style rules for the component if the component is in the white list, and excluding style rules for the component if the component is in the black list. The "children" (i.e., pseudo-elements) of each style rule included in the reduced set are also added to the reduced set for inclusion in the e-mail message.

In one set of embodiments, the white list contains the names of components for which style rules can be included in the reduced set of needed style rules (if those components occur in the document). Any style rules associated with each component in the white list will be included in the reduced set along with the sub-rules of those included rules. As an example, if the white list contains the name af:inputText, then style rules of the af:inputText component, such rules having the selector af|inputText, will be included in the reduced set if there is an af:inputText component in the document, and the pseudo-elements such as af|inputText::content and af|inputText::label will be included if af|inputText is included. A list of the style rules associated with the af:inputText component is shown in Table 1 below (from the web page at http://jdevadf.oracle.coem/adf-richclient-demo/docs/skin-selectors.html). The style rules associated with a component can be determined programmatically by, for example, invoking the ADF RichRenderer.getDefaultStyleClass method.

In one set of embodiments, the black list includes link components and input components that do not have a read-only mode, because the components in the e-mailed message are in read-only mode. Components for selecting user interface options that are not modifiable in the e-mail-embedded document, such as a colors or dates, are also included in the black list. Certain components that could be rendered but are not desired, e.g., because they are not used, can also be included in the black list. In one set of embodiments, components that require JavaScript™ or other script-

TABLE 1

Selectors and Sub-selectors for af:inputText component

| Name | Description |
| --- | --- |
| af|inputText | Style on the root element of the af:inputText component. Available pseudo-classes are :disabled, :read-only, :error, :fatal, :warning, :info, and :confirmation. For example, you can style the label when the component is disabled by using this selector: "af|inputText:disabled::label" |
| af|inputText::access-key | Style on the access key for the label of the af:inputText component. For example, underline the access key. Includes .AFFormAccessKeyStyle:alias. |
| af|inputText::content | Style on the content of the af:inputText component. You can set the width of the content piece that will be used when the columns attribute on af:inputText is not set. |
| af|inputText::context-content | Style that goes around both the context facet and the content. Can be used to control the content padding when the context facet is set, For example: af|inputText::context-content af|inputText::content{padding-left:7px;} |
| af|inputText::dynamic-help-icon-style | Style the dynamic help icon. By default the dynamic-help-icon is null, and this style has a background-image that you can override. Available pseudo-classes are :disabled:hover, :hover and :active. Includes .AFDynamicHelpIconStyle:alias. |
| af|inputText::label | Style on the label of the af:inputText component. This includes .AFLabel:alias style selector. :disabled::label includes .AFLabelDisabled:alias. |

In one aspect, the following selectors are included in the white list: af|column, af|document, af|goLink, af|image, af|inputComboboxListOfValues, af|inputDate, af|inputListOfValues, af|inputNumberSlider, af|inputNumberSpinbox, af|inputRangeSlider, af|inputText, af|outputText, af|panelFormLayout, af|panelGroupLayout, af|panelHeader, af|panelLabelAndMessage, af|panelList, af|selectOneChoice, af|showDetailHeader, af|spacer, and af|table. Style rule names such as AFFieldTextMarker that do not contain a vertical bar character ("|") are not specific to a particular component, i.e., can apply to a page, and are therefore also added to the list.

ing languages are included in the black list, because JavaScript is not supported in e-mail-embedded documents. Components for navigating between pages are also included in the black list because navigation between pages is not supported in e-mail messages. Components that display server-related information are included in the black list because server information is not available in e-mail messages. In one example, the black list is independent of the particular web page document 104.

In one aspect, the components added to the black list are shown in Table 2 below.

TABLE 2

| Component | Remarks |
| --- | --- |
| UICommand, CommandButton, CommandMenuItem, CommandNavigationItem, and CommandToolbarButton | Command components cannot be used in the context of an e-mail since they use an application context. |
| UIXChoose | The user cannot choose a color or date in the e-mail and this component does not have read only mode. |
| GoButton | Links are shown because they have content, but a go button does not have text information to be shown. Go components could be rendered, but we chose not to as they are not needed. |
| GoMenuItem, UIXNavigationLevel, and UIXNavigationPath | These are menus; the Navigation components could be rendered if needed. |

TABLE 2-continued

| Component | Remarks |
|---|---|
| Poll | Polls the server and uses JavaScript, which e-mail does not support; also it doesn't render anything. |
| Popup | Uses JavaScript. |
| Process | Navigates in a train, but there is no navigation between pages in e-mail mode. |
| Progress | Progress indicator not meaningful in e-mail mode. |
| Reset | Resets form, but form components in e-mail mode are read-only. |
| Menu, MenuBar, Toolbar, and Toolbox | Menus, toolbars, and toolboxes are chrome, and users do not want to show chrome in their e-mail. |
| StatusIndicator | StatusIndicator displays various icons, animated and static, to indicate server activity, but there is no server activity in e-mail. |

Referring again to FIG. 5, block 502 initiates a loop that traverses the components in the document, visiting each non-hidden component in the document and invoking block 504 for each such component. Block 504 determines if the component's type is in the black list. If so, then the component is skipped, block 512 determines if there are more of the non-hidden components identified in block 502 to process, and if so, block 506 selects the next component and invokes block 504 again for the next component. "Pseudo-classes," such as the :hover and :active classes, are not included in the result list because they are not applicable to e-mail messages. Pseudo-classes can be included in the black list or can be explicitly checked for and excluded. In one example, if the component's type is not in the black list, then the type is considered to be in the white list. If the component's type is not in the black list, then block 508 queries the ADF framework for the component's style rule name (e.g., by invoking the ADF RichRenderer.getDefaultStyleClass method), and adds the component's style rule (e.g., a selector name that corresponds to the style rule) to the set of style rules for the document presently being processed. If block 512 determines that there are more components to process, block 506 selects the next component, and execution continues with the next component at block 504.

User interfaces can have hierarchies of components, and in the ADF framework, each component can have one or more "child" components, so that the user interface components are structured in a tree hierarchy. If the component's type is not in the black list, then the component's child components are processed. In this case, block 510 invokes block 502 for the component itself, so that block 502 will traverse child components of the component. Once the child components have been processed, block 502 returns (as in a return from a recursive procedure call), and block 510 transfers control to block 512 to process the next component at the level that was being processed prior to invocation of block 510. The process continues until each component in the document has been processed and each qualifying component style rule name has been added to the list of style rules by block 508, at which point the resulting list of style rules is passed back to block 404 of FIG. 4.

Figure 6:
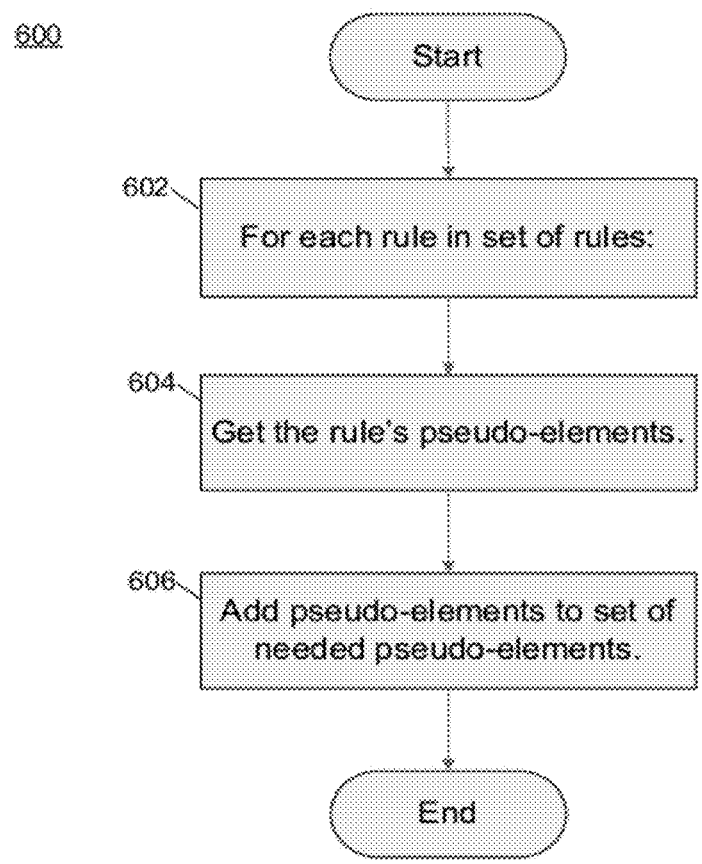
FIG. 6 is a flow diagram illustrating a method for generating a list of sub-rules to be included in a style rule based on a document in accordance with an embodiment of the present invention.

FIG. 6 is a flow diagram illustrating a process for generating a list of pseudo-elements to be included in a style rule based on a document in accordance with an embodiment of the present invention. Tags in a page markup language such as HTML or JSF can have multiple style rules in addition to their default style rules. The process illustrated in FIG. 6 generates a list of pseudo-elements of the style rules identified by the process of FIG. 5. For example, the af:inputText component's selector is af|inputText. The af|inputText selector has associated pseudo-elements such as af|inputText::label and af|inputText::content. In one example, the pseudo-elements can be determined by invoking the method getSelectorsForSimpleSelector( ) of the Styles class in the Apache Trinidad programming interface. Block 602 identifies and iterates through the rules in the style rules list generated by the process of FIG. 5. Block 604 identifies the pseudo-elements( ) of each style rule. Block 606 adds the pseudo-element(s) identified in block 604 to a list of needed pseudo-elements, which is returned to the process of FIG. 4 after the style rules have been processed by block 602.

Figure 7:
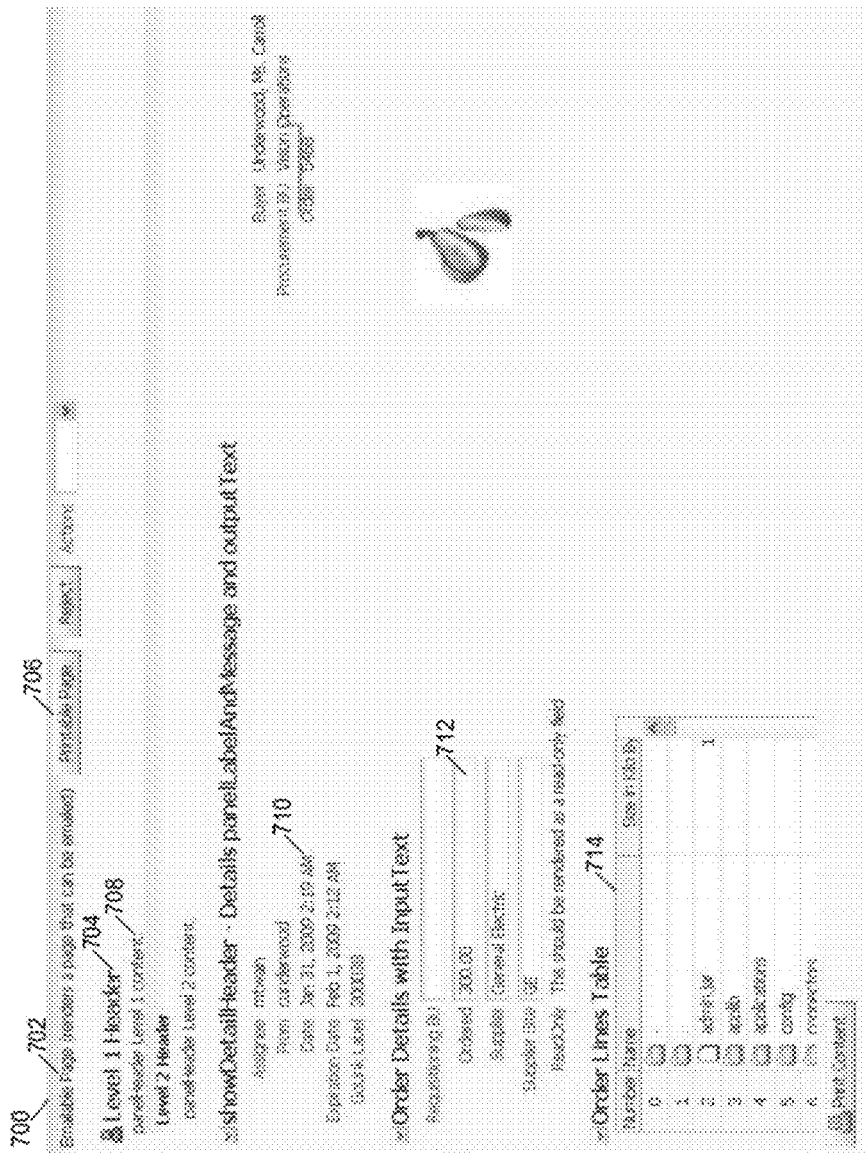
FIG. 7 illustrates a web application page that can be used in accordance with embodiments of the invention.

FIG. 7 illustrates a web application page that can be used in accordance with embodiments of the invention. The page 700 includes an E-mail Page link 702, which a user can select to initiate the process of converting the page to an e-mail message, including filtering the style sheet associated with the page. The page includes a Level 1 header 704, which is associated with a "H1" style selector. A Printable Page button 706, which a user can select to generate a printable page. The page includes text content 708 and 710, as well as input text content 712 and a table 714.

Figure 8:
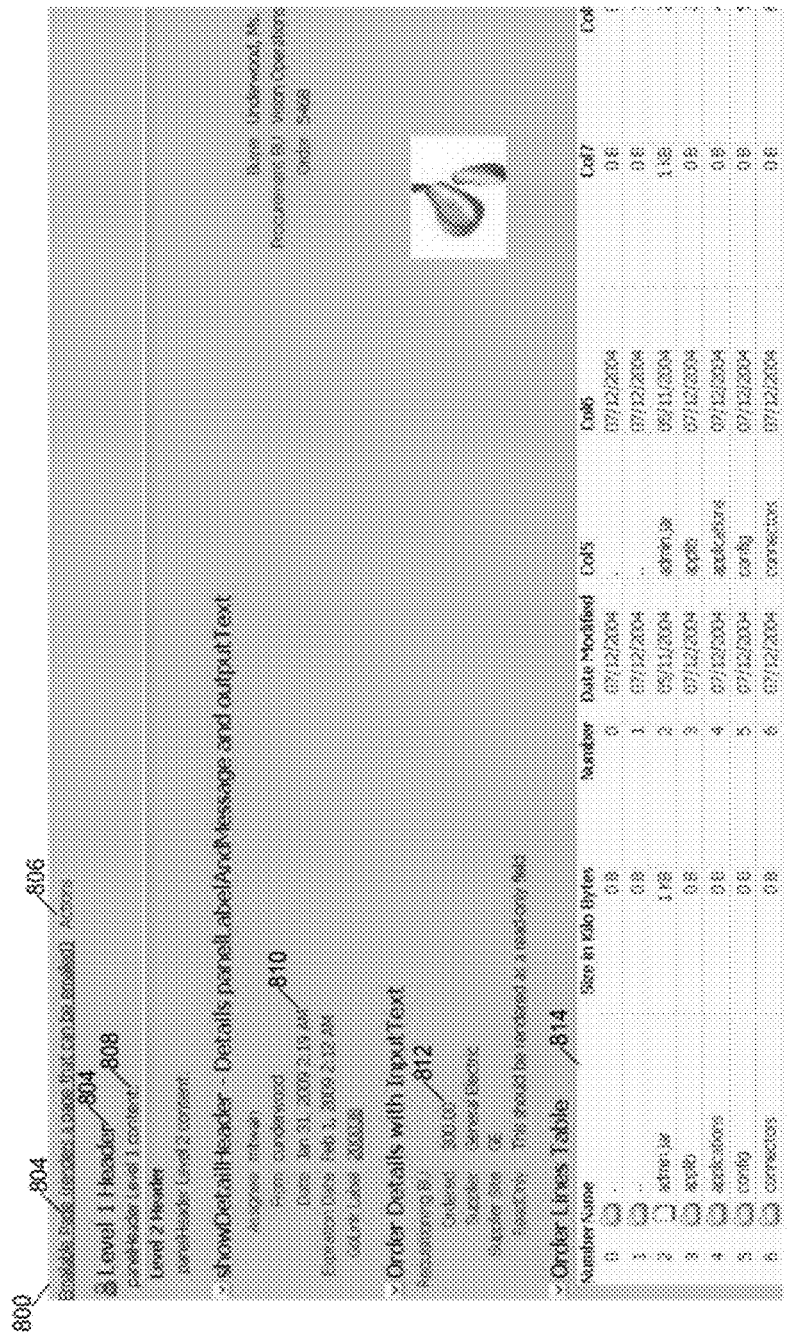
FIG. 8 illustrates an e-mail rendition of the web application page of FIG. 7 that can be used in accordance with embodiments of the invention.

FIG. 8 illustrates an e-mail rendition of the web application page of FIG. 7 that can be used in accordance with embodiments of the invention. The e-mail rendition 800 includes the user interface features of FIG. 7 rendered in an e-mail message that can be used to send the rendition of the web page via e-mail.

Figure 9:
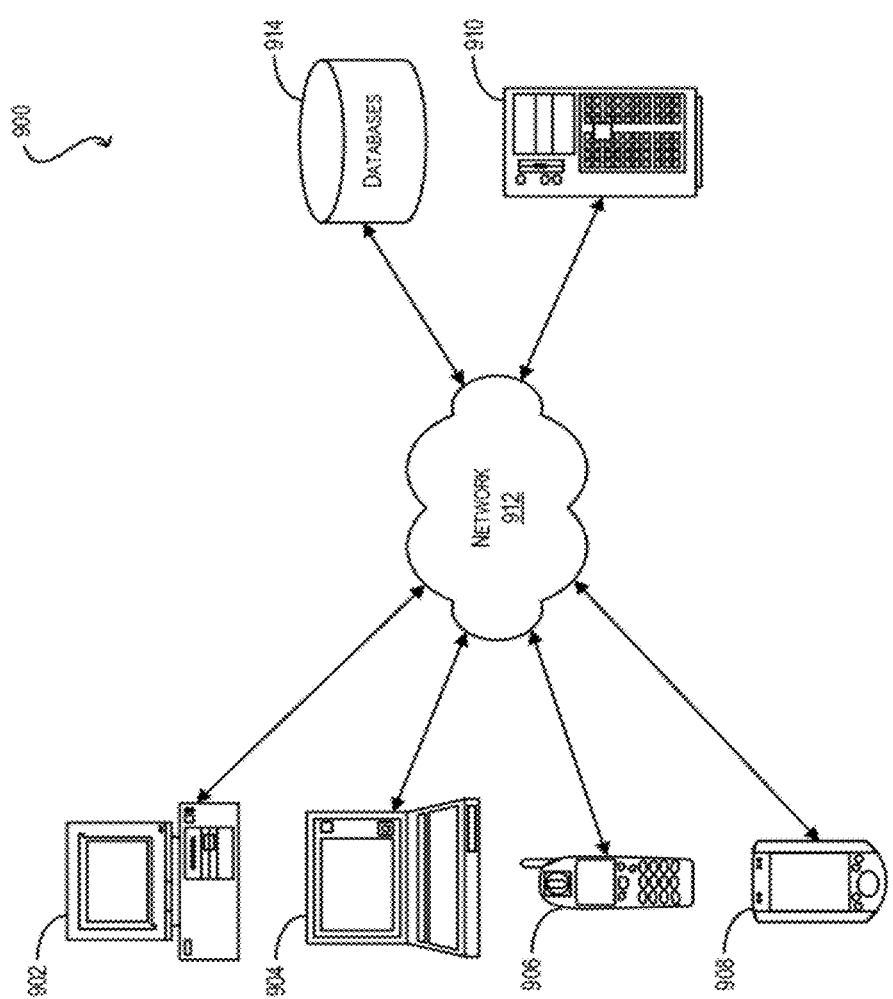
FIG. 9 is a simplified block diagram illustrating a system environment that can be used in accordance with an embodiment of the present invention.

FIG. 9 is a simplified block diagram illustrating a system environment 900 that can be used in accordance with an embodiment of the present invention. As shown, system environment 900 can include one or more client computing devices 902, 904, 906, 908, which can be configured to operate a client application such as a web browser, a UNIX/Solaris terminal application, and/or the like. In various embodiments, client computing devices 902, 904, 906, 908 can correspond to the client 120 of FIG. 1, and can be operated by one or more users to invoke and interact with the style sheet filter 108 to generate reduced-size style sheets for inclusion in e-mail messages.

Client computing devices 902, 904, 906, 908 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 902, 904, 906, 908 can be any other electronic device capable of communicating over a network, such as network 912 described below. Although system environment 900 is shown with four client computing devices, it should be appreciated that any number of client computing devices can be supported.

System environment 900 can further include a network 912. Network 912 can be any type of network familiar to those skilled in the art that can support data communications using a network protocol, such as TCP/IP, SNA, IPX, AppleTalk, and the like. Merely by way of example, network 912 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 900 can further include one or more server computers 910 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 910 can run an operating system including any of those discussed above, as well as any commercially available server operating system. Server 910 can also run any of a variety of server applications and/or mid-tier applications, including web servers, FTP servers, CGI servers, Java virtual machines, and the like. In one set of embodiments, server 910 can correspond to the server computer 102 of FIG. 1.

System environment 900 can further include one or more databases 914. In one set of embodiments, databases 914 can include databases that are managed by server 910. Databases 914 can reside in a variety of locations. By way of example, databases 914 can reside on a storage medium local to (and/or resident in) one or more of computers 902, 904, 906, 908, and 910. Alternatively, databases 914 can be remote from any or all of computers 902, 904, 906, 908, and 910, and/or in communication (e.g., via network 912) with one or more of these. In one set of embodiments, databases 914 can reside in a storage-area network (SAN) familiar to those skilled in the art.

Figure 10:
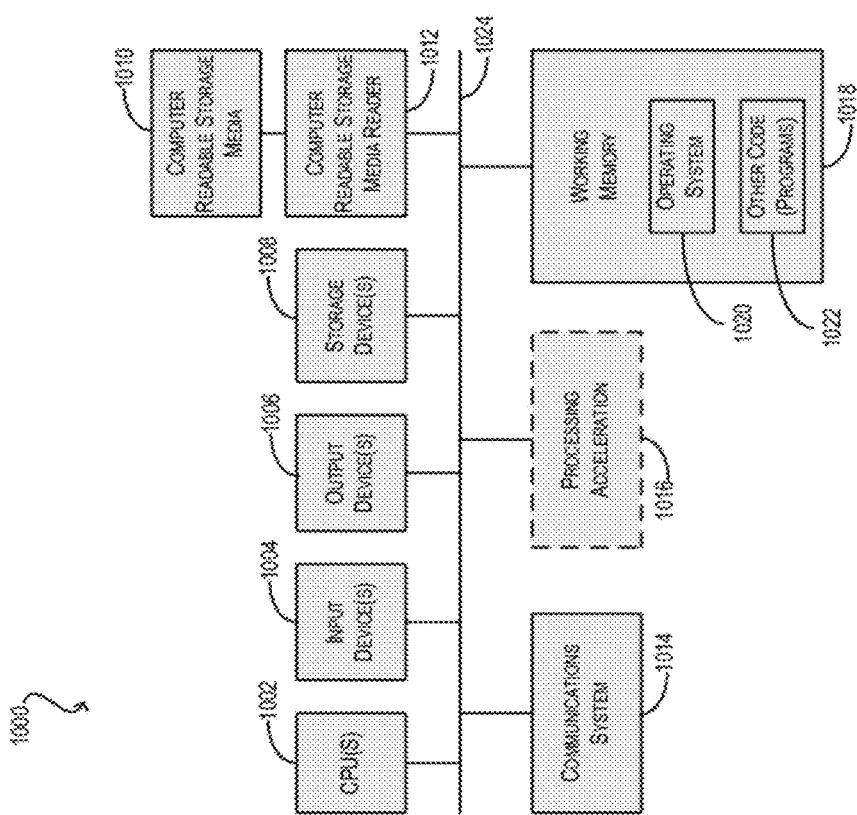
FIG. 10 is a simplified block diagram illustrating a computer system that can be used in accordance with an embodiment of the present invention.

FIG. 10 is a simplified block diagram illustrating a computer system 1000 that can be used in accordance with an embodiment of the present invention. In various embodiments, computer system 1000 can be used to implement any of computers 902, 904, 906, 908, and 910 described with respect to system environment 900 above. As shown, computer system 1000 can include hardware elements that are electrically coupled via a bus 1024. The hardware elements can include one or more central processing units (CPUs) 1002, one or more input devices 1004 (e.g., a mouse, a keyboard, etc.), and one or more output devices 1006 (e.g., a display device, a printer, etc.). Computer system 1000 can also include one or more storage devices 1008. By way of example, the storage device(s) 1008 can include devices such as disk drives, optical storage devices, and solid-state storage devices such as a random access memory (RAM) and/or a read-only memory (ROM), which can be programmable, flash-updateable and/or the like.

Computer system 1000 can additionally include a computer-readable storage media reader 1012, a communications subsystem 1014 (e.g., a modem, a network card (wireless or wired), an infra-red communication device, etc.), and working memory 1018, which can include RAM and ROM devices as described above. In some embodiments, computer system 1000 can also include a processing acceleration unit 1016, which can include a digital signal processor (DSP), a special-purpose processor, and/or the like.

Computer-readable storage media reader 1012 can be connected to a computer-readable storage medium 1010, together (and, optionally, in combination with storage device(s) 1008) comprehensively representing remote, local, fixed, and/or removable storage devices plus storage media for temporarily and/or more permanently containing computer-readable information. Communications system 1014 can permit data to be exchanged with network 912 and/or any other computer described above with respect to system environment 900.

Computer system 1000 can also comprise software elements, shown as being currently located within working memory 1018, including an operating system 1020 and/or other code 1022, such as an application program (which may be a client application, Web browser, middle tier/server application, etc.). It should be appreciated that alternative embodiments of computer system 1000 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 1000 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, an any other medium that can be used to store data and/or program code and that can be accessed by a computer.

Although specific embodiments of the invention have been described above, various modifications, alterations, alternative constructions, and equivalents are within the scope of the invention. For example, the techniques described above are not limited to recommending alternative execution plans for SQL-formatted statements; rather, they can be used to recommend alternative plans for any type of database query language statement. Further, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
at a computer system having a processor and a memory, the memory storing a web document, wherein the web document comprises a representation of a user interface and an initial set of style rules for user interface components of the user interface that are compatible for use with a web browser:
receiving, by the processor, a request to generate an e-mail message using the web document;
generating, by the processor, a reduced set of style rules for the user interface components of the user interface that are compatible with the e-mail message, the generating comprising:
determining, by the processor, whether each of the user interface components is at least partially incompatible for use with the e-mail message, wherein the user interface components that are at least partially incompatible with the e-mail message are components that use features available in the web browser but the features are not available in an e-mail client application,
identifying, by the processor, at least one user interface component of the user interface components that is compatible with the e-mail message when the at least one user interface component is not at least partially incompatible for use with the e-mail message,
identifying, by the processor, at least one style rule in the initial set of style rules that references the at least one user interface component that is identified as compatible with the e-mail message, and
adding, by the processor, the identified at least one style rule to the reduced set of style rules, wherein the reduced set of style rules does not include style rules that are specifically for the user interface components that are at least partially incompatible for use with the e-mail message, and
embedding, by the processor, the representation of the user interface and the reduced set of style rules in the e-mail message, wherein the representation of the user interface and the reduced set of style rules are configured to render the user interface components of the user interface in the e-mail message without the style rules that are specifically for the user interface components that are at least partially incompatible for use with the e-mail message.

2. The method of claim 1, wherein identifying the at least one user interface component that is compatible with the e-mail message comprises identifying a user interface component having a read-only mode.

3. The method of claim 1, wherein identifying the at least one user interface component that is compatible with the e-mail message comprises identifying a user interface component configured to only execute operations that are available in an e-mail client application.

4. The method of claim 1, wherein identifying the at least one user interface component that is compatible with the e-mail message comprises identifying a user interface component that does not use a scripting language.

5. The method of claim 1, wherein identifying the at least one style rule in the initial set of style rules is performed without rendering the web document.

6. The method of claim 1, wherein a style sheet that includes the reduced set of style rules is smaller in size than the initial style sheet.

7. A system comprising:
a processor; and
a memory configured to store a set of instructions that when executed by the processor configure the processor to:
receive a request to generate an e-mail message and receive a web document to include in the e-mail message, wherein the web document comprises a representation of a user interface generated according to an application development framework and an initial set of style rules for specifying information styling at least one or more user interface components of the user interface that are compatible for use with a web browser;
generate a reduced set of style rules for the at least one or more user interface components of the user interface that are compatible with the e-mail message, the generate comprising:
determine whether each of the at least one or more user interface components is included in a black list, wherein the black list includes user interface components that are at least partially incompatible for use with the e-mail message, wherein the user interface components that are at least partially incompatible with the e-mail message are components that use features available in the web browser but the features are not available in an e-mail client application;
identify at least one user interface component of the at least one or more user interface components that is compatible with the e-mail message when the at least one user interface component is not included in the black list;
identify at least one style rule in the initial set of style rules that references the at least one user interface component that is identified as compatible with the e-mail message; and
add the identified at least one style rule to the reduced set of style rules, wherein the reduced set of style rules does not include style rules that are specifically for the user interface components that are at least partially incompatible for use with the e-mail message; and
embed the representation of the user interface and the reduced set of style rules in the e-mail message, wherein the representation of the user interface and the reduced set of style rules are configured to render the at least one or more user interface components of the user interface in the e-mail message without the style rules that are specifically for the user interface components that are at least partially incompatible for use with the e-mail message.

8. The system of claim 7, wherein to identify the at least one user interface component that is compatible with the e-mail message the processor is further configured to identifying a user interface component having a read-only mode.

9. The system of claim 7, wherein to identify the at least one user interface component that is compatible with the e-mail message the processor is further configured to identifying a user interface component configured to only execute operations that are available in an e-mail client application.

10. The system of claim 7, wherein to identify the at least one user interface component that is compatible with the e-mail message comprises identifying a user interface component that does not use a scripting language.

11. The system of claim 7, wherein the processor is further configured to identify the at least one style rule in the initial set of style rules without rendering the web document.

12. The system of claim 7, wherein the reduced set of style rules is smaller in size than the initial set of style rules.

13. A non-transitory machine-readable medium for a computer system, the non-transitory machine-readable medium having stored thereon a series of instructions executable by a processor, the series of instructions comprising:

instructions that cause the processor to receive a request to generate an e-mail message and receive a web document to include in the e-mail message, wherein the web document comprises a representation of a user interface and an initial set of style rules for specifying information styling at least one or more user interface components of the user interface that are compatible for use with a web browser;

instructions that cause the processor to generate a reduced set of style rules for the at least one or more user interface components of the user interface that are compatible with the e-mail message, the generate comprising:

instructions that cause the processor to determine whether each of the at least one or more user interface components is at least partially incompatible for use with the e-mail message, wherein the user interface components that are at least partially incompatible with the e-mail message are components that use features available in the web browser but the features are not available in an e-mail client application;

instructions that cause the processor to identify at least one user interface component of the at least one or more user interface components that is compatible with the e-mail message when the at least one user interface component is not at least partially incompatible for use with the e-mail message;

instructions that cause the processor to identify at least one style rule in the initial set of style rules that references the at least one user interface component that is identified as compatible with the e-mail message; and instructions that cause the processor to add the identified at least one style rule to the reduced set of style rules, wherein the reduced set of style rules does not include style rules that are specifically for the user interface components that are at least partially incompatible for use with the e-mail message; and instructions that cause the processor to embed the representation of the user interface and the reduced set of style rules in the e-mail message, wherein the representation of the user interface and the reduced set of style rules are configured to render the at least one or more user interface components of the user interface in the e-mail message without the style rules that are specifically for the user interface components that are at least partially incompatible for use with the e-mail message.

14. The non-transitory machine-readable medium of claim 13, wherein the instructions that cause the processor to identify the least one user interface component that is compatible with the e-mail message comprise instructions that cause the processor to identify a user interface component having a read-only mode.

15. The non-transitory machine-readable medium of claim 13, wherein the instructions that cause the processor to identify the least one user interface component that is compatible with the e-mail message comprise instructions that cause the processor to identify a user interface component that is configured to only execute operations that are available in an e-mail client application.

16. The non-transitory machine-readable medium of claim 13, wherein the instructions that cause the processor to identify the least one user interface component that is compatible with the e-mail message instructions that cause the processor to identify a user interface component that does not use a scripting language.

17. The non-transitory machine-readable medium of claim 13, wherein the instructions further cause the processor to identify the at least one style rule in the initial set of style rules without rendering the web document.

* * * * *